United States Patent [19]

Finney

[11] Patent Number: 4,791,340
[45] Date of Patent: Dec. 13, 1988

[54] INDUCTION MOTOR DRIVE ARRANGEMENT

[75] Inventor: David Finney, Daventry, England

[73] Assignee: The General Electric Company, p.l.c., England

[21] Appl. No.: 44,460

[22] PCT Filed: Jul. 31, 1986

[86] PCT No.: PCT/GB86/00456
§ 371 Date: Mar. 27, 1987
§ 102(e) Date: Mar. 27, 1987

[87] PCT Pub. No.: WO87/00992
PCT Pub. Date: Feb. 12, 1987

[30] Foreign Application Priority Data

Jul. 21, 1985 [GB] United Kingdom ........... 8519270

[51] Int. Cl.⁴ .................................. H20P 5/28
[52] U.S. Cl. ........................... 318/809; 318/767; 318/807; 318/794
[58] Field of Search ............ 318/767, 794–796, 318/807, 809–812, 723; 363/49, 56–58

[56] References Cited

U.S. PATENT DOCUMENTS 4,100,469  7/1978  Nelson et al. ............... 318/809
4,443,747  4/1984  Chausse et al. ............. 318/723
4,446,414  5/1984  Tupper ....................... 318/723
4,633,158 12/1986  Hirata et al. ............... 318/809

OTHER PUBLICATIONS

Japanese Abstract 55-37839, Mitsubishi Denki K.K., "Eciting Current Controller for Induction Motor" 3/80.
Jap. Abs. 55-139093, Tokyo Shibaura Denki K.K., "Device for Controlling Phase of Induction Motor" 10/80.

Primary Examiner—William M. Shoop, Jr.
Assistant Examiner—Brian K. Young
Attorney, Agent, or Firm—Kirschstein, Kirschstein, Ottinger & Israel

[57] ABSTRACT

A self-excited induction motor variable speed drive using a known self-excitation method in which a capacitor is connected in parallel with the motor. Power is supplied by a supply convertor, a D.C. link and a motor convertor, the latter running at the motor frequency. The motor convertor includes a current bypass switching circuit comprising a capacitor bank connected to the motor terminals and to a neutral point between a pair of thyristors connected across the D.C. link.

7 Claims, 4 Drawing Sheets

4,791,340

INDUCTION MOTOR DRIVE ARRANGEMENT

BACKGROUND OF THE INVENTION

1. Field of the Invention

This invention relates to induction motor drive arrangements and particularly to such arrangements employing a motor convertor supplied from a controllable D.C. source.

2. Description of the Related Art

Such arrangements are known in which the D.C. source is provided by a three-phase thyristor rectifier bridge, the 'supply convertor', which can be phase controlled to determine the D.C. link current between the supply convertor and the motor convertor. One or more D.C. reactors in the D.C. link provide current inertia to maintain the motor convertor current during switching operations.

In addition, it is known to provide a capacitor bank in parallel with an induction motor to provide external excitation, since an induction motor, unlike a synchronous motor for example, will not generate voltage and provide its own excitation.

While an induction motor can be made to operate with excitation capacitors in this way, there is no direct control of the speed.

SUMMARY OF THE INVENTION

An object of the present invention is to provide an induction motor drive which offers speed control over a wide range and constant or controllable torque over this range.

According to the present invention an induction motor drive arrangement comprises a controllable D.C. source, reactance means providing D.C. current inertia, a motor convertor circuit comprising a thyristor-bridge whose input is connected to the D.C. source and whose A.C. output is connected to motor supply terminals for connection to an induction motor, capacitive excitation means connected to the motor supply terminals for maintaining induction motor excitation, and a commutation circuit comprising commutating capacitance connected between each of the motor supply terminals and a commutation neutral point, and a bypass path comprising two thyristor arms in series between input terminals of the thyristor bridge, the junction of the two thyristor arms being connected to the neutral point, the thyristors of said bypass arms being fired to bypass current from said motor convertor thyristors to said commutating capacitance, the thyristors of said motor convertor bridge being fired cyclically in dependence upon the voltage across said commutating capacitance, and said D.C. source current being controlled in dependence upon required motor speed and torque.

The controllable D.C. source is preferably a thyristor bridge convertor having a phase-control firing circuit for controlling the current supply to the motor convertor.

The capacitive excitation means preferably comprises a bank of capacitors connected symmetrically to the motor supply terminals.

A firing circuit for the motor convertor bridge thyristors and the bypass arm thyristors is preferably initiated by voltages between neutral points of the commutation and excitation capacitors.

BRIEF DESCRIPTION OF THE DRAWINGS

An induction motor drive arrangement will now be described, by way of example, with reference to the accompanying drawings, of which.

DETAILED DESCRIPTION OF THE PREFERRED EMBODIMENTS

Figure 1:
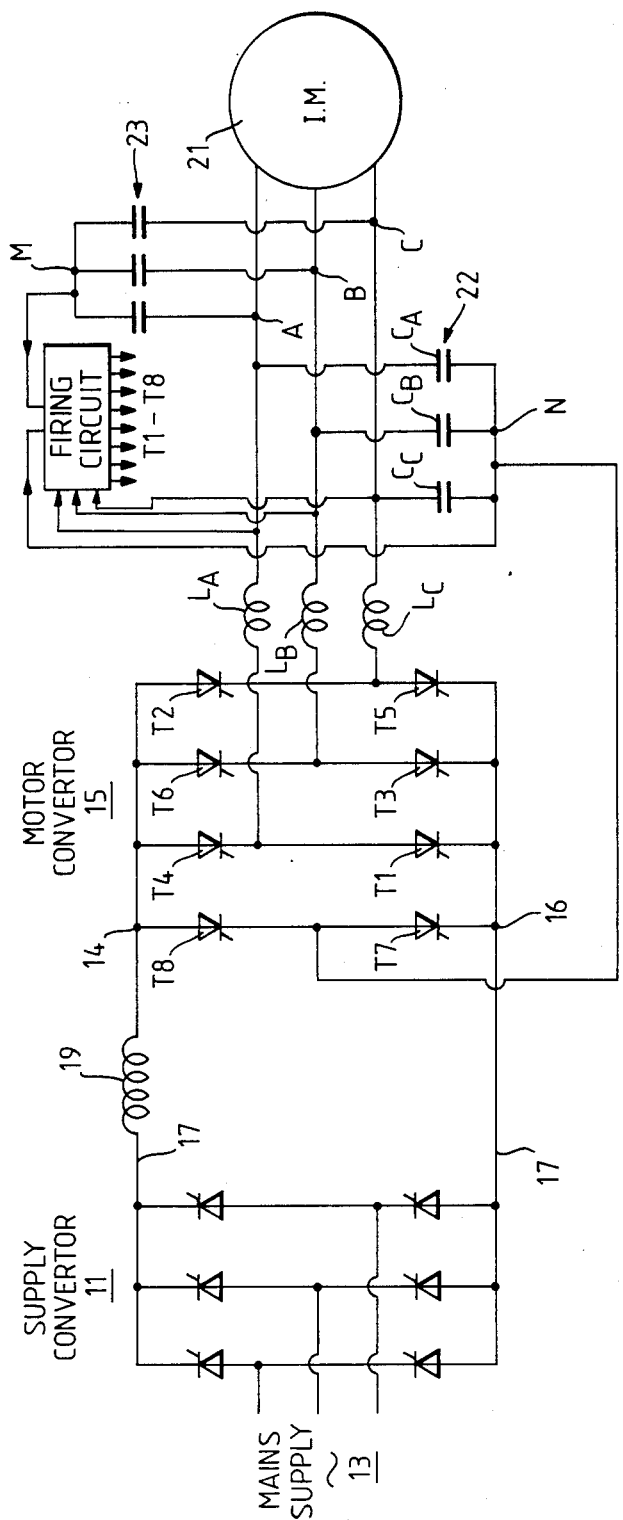
FIG. 1 is a diagram of an induction motor drive circuit fed from an A.C. mains.

Referring to FIG. 1 of the drawings, a controllable D.C. source is provided by a thyristor bridge supply convertor 11 connected to a 3-phase A.C. supply 13. The supply convertor is connected to a motor convertor 15 which also comprises a 3-phase thyristor bridge. The two convertors are connected by a D.C. link 17, in one or both of which a D.C. link reactor 19 is connected. The inertial effect of this reactor tends to stabilise the current and maintain conduction in the motor convertor during commutation. Control of the current level in the D.C. link is largely effected by the supply convertor, as will be explained.

The 3-phase output of the motor convertor, operating as an inverter, is applied to an induction motor 21 by way of motor terminals A, B and C. Connected across the motor terminals is a bank of capacitors 23 providing external excitation for the motor enabling it to generate terminal voltage necessary for commutation of the motor convertor. This is achieved by the capacitor bank providing a low loss path for the motor currents which could not otherwise be maintained.

In an arrangement as so far described, there is no control of the motor speed. Variable frequency drives for induction motors have been proposed but they have suffered from disadvantages either in complexity or in a need for high speed turn-off thyristors which are expensive. The present invention provides an extremely simple commutating circuit and provides the additional important advantage that low-speed, and therefore relatively cheap, thyristors can be used for the motor convertor with little or no fear of switching problems.

A bypass path consisting of two thyristors T7 and T8 in series, is connected across the input terminals 14 and 16 of the motor convertor providing, in effect, two further arms to the bridge, poled similarly to the existing arms. A bank 22 of three capacitors $C_A$, $C_B$ and $C_C$ are star connected, one to each output line of the motor convertor, the other capacitor terminals being connected to a neutral point N (the 'commutation neutral'). Inductors $L_A$, $L_B$ and $L_C$ are connected in series in the output of the thyristor bridge. These inductors are purely to suppress rapid transients and are not essential to the operation.

The neutral point N is connected to the junction 18 of the two bypass thyristor arms.

The thyristors of the motor convertor 15 are referenced T1 to T6 in the order of their firing. A firing circuit 25 is required to respond to the voltage across the commutation capacitors 22 and is conveniently driven by the voltage between the neutral points M and N and the voltages at motor terminals A, B and C.

Finally, the bypass thyristors T7 and T8 are fired alternately one after each firing of the thyristors T1 to T6, as will be explained with reference to FIG. 2, and in dependence upon the requirements of the motor characteristic of FIG. 3.

Figure 2:
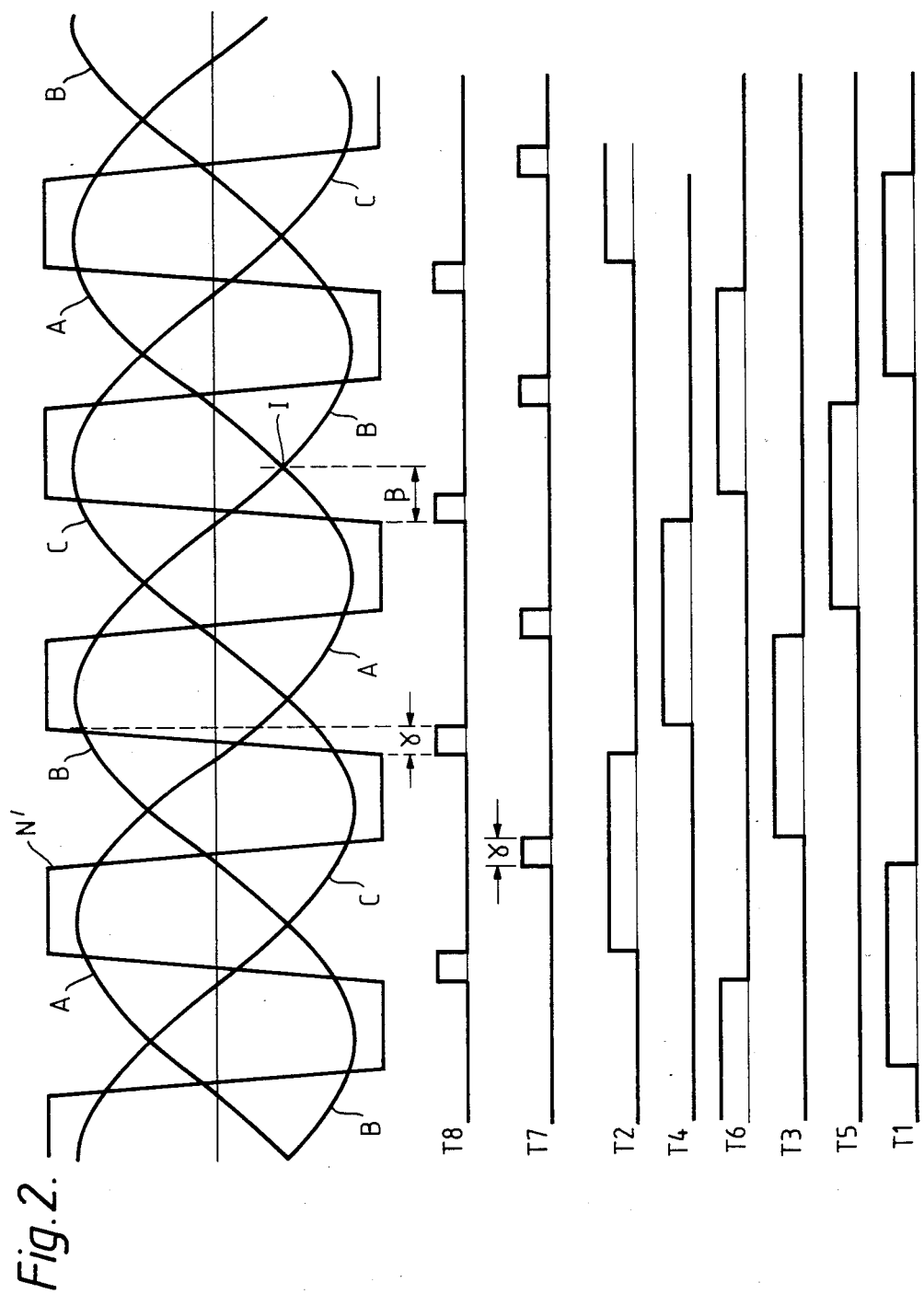
FIG. 2 is a waveform diagram for a particular operating condition of the circuit of FIG. 1.

Referring now to FIG. 2, this shows current and voltage waveforms associated with the motor and motor convertor. The three-phase sine waves represent the output voltages of the motor convertor, i.e. at the motor terminals A, B and C.

The bypass arms T7 and T8 are fired alternately, T7 while an odd-numbered bridge thyristor is conducting and T8 while an even-numbered thyristor is conducting. The effect of firing T7 or T8 is to deprive the associated conducting bridge thyristor of current and bypass the current to or from the commutating capacitor bank 22. The bridge thyristor is thus cut-off and firing of the next bridge thyristor of the same pole can be effected. Thus, it may be seen from FIG. 2 that, when T8 is fired while T6 is conducting, the latter turns off and allows T2 to be fired. T8 therefore allows the circuit current to be transferred from T6 to T2, the current being removed from T6 for a period of time sufficient for T6 to regain its blocking capability and for the commutating capacitors 22 to recharge. Once T2 is fired the circuit current transfers from T8 into T2.

The timing of the firing of bypass thyristors T7 and T8 is related to the "inversion crossover" point I, being set an an angle $\beta$ within $\pm 90°$ of this point. The condition shown is 30° in advance and the effect of different angles will be explained with reference to FIG. 3. Thisangle $\beta$ may be seen to be $180° - \alpha$ where $\alpha$ is the conventional delay angle from the 'natural' conduction point at which a diode would conduct.

The firing of T8 takes the commutation neutral N up to the D.C. link potential at bridge input 14 while the firing of T7 takes the neutral potential down to D.C. link potential 16. The neutral potential is shown by the trapezoidal waveform N' and the duration of the sloping portions is determined by: the value of the commutation capacitance which is charged or discharged by the bypass current, and the magnitude of the D.C. link current which constitutes the charging/discharging current. The bypass thyristor is cut off by the firing of the next bridge thyristor (e.g. T4 after T2), in response to the commutation capacitor voltage reaching a predetermined level, at which point the netural potential remains constant at the upper or lower peak level of waveform N' until the alternate bypass thyristor is fired.

The conduction angle of each bypass thyristor is referred to as the gamma angle ($\gamma$) and is not normally allowed to exceed 30°. In the example shown in FIG. 2 $\gamma$ is 15° and $\beta$ is 30°.

As $\beta$ is varied in FIG. 2, all of the waveforms shift relative to the sine waves of the convertor output.

Figure 3:
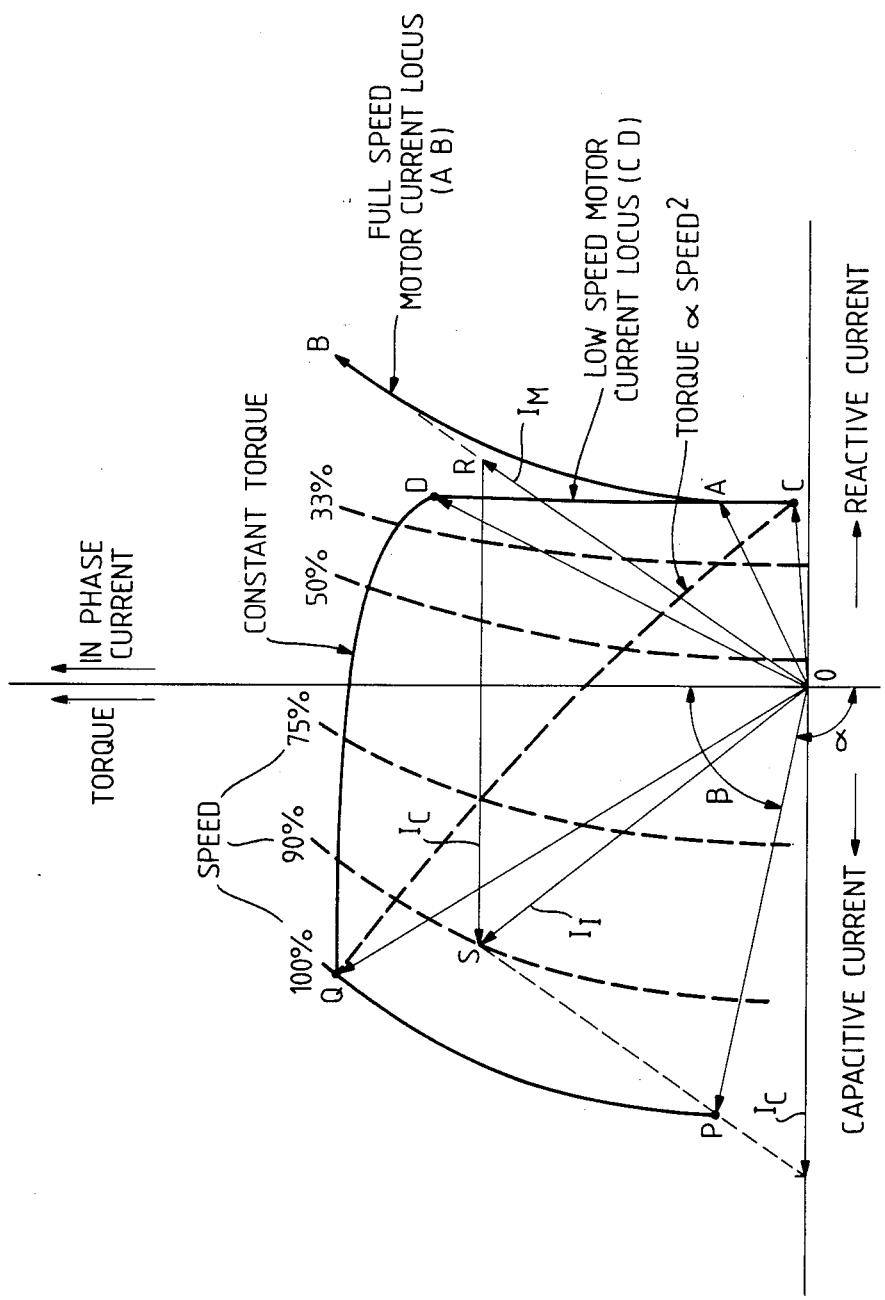
FIG 3 is a motor/convertor operating characteristic for the circuit of FIG. 1.

Referring now to FIG. 3, this shows the motor and motor convertor characteristics under control of the commutating circuit of FIG. 1. The vertical axis is the motor current component in-phase with the motor voltage and thus proportional to the motor torque. The horizontal axis gives, to the right, the reactive current component providing the motor magnetisation, and to the left, the excitation capacitor current.

The vertical curve CAD is the locus of the motor current vector, e.g. OA or OD, at low speed. Thus vector OC corresponds to zero speed and zero torque while vector OD corresponds to zero speed and full torque.

Similarly, the curve AB is the locus of the motor current vector for full speed conditions. Thus OA is the full-speed low-load current vector and OB is the full-speed full-load current vector. The area CADBAC thus represents the locus of all required motor current vectors. It is these current vectors which must be provided by the motor convertor 15, taking account of the current drawn by the excitation capacitor bank 23.

Thus the convertor current is required to equal the vector sum of the motor current and the excitation capacitor current at all speeds within the control range. For example, a vector OR within the area CADBAC, representing a significant torque level and a speed approaching full speed (i.e. R is closer to the characteristic AB than to CD), is obtained as the difference between an invertor current vector OS and the excitation capacitor current vector $I_c$.

The full speed convertor current vectors lie within the range of OP at low torque and OQ at full torque.

The effect of varying $\beta$ in FIG. 2 can be seen in FIG. 3, $\beta$ being the angle between the vertical 'in-phase' convertor voltage axis and the convertor current vector (OP in the example illustrated). Thus the phase of the convertor current is controllable by control of $\beta$, which can be varied on either side of the voltage axis by 90°. The magnitude of the motor convertor current (and thus of course of the motor current) is controllable by phase control of the supply convertor 11. The motor convertor current vector is therefore fully controllable to provide, in combination with the excitation capacitor current (which is not directly controllable but depends upon the motor terminal voltage and frequency), the desired motor current vector.

By control of $\beta$ therefore, a torque characteristic approximately constant over a large speed range can be obtained, e.g. the curve QD covering the range full-speed to zero-speed.

OP and OQ are the low-torque and full-torque convertor current vectors at full speed. Thus PQ is the convertor current locus for varying torque at full speed. The similar broken curves labelled "90% speed", "75% speed", etc. are corresponding convertor current loci for torque variation at the indicated speeds.

Curve CQ is the locus of convertor current which gives a torque varying with the square of the speed.

Figure 4:
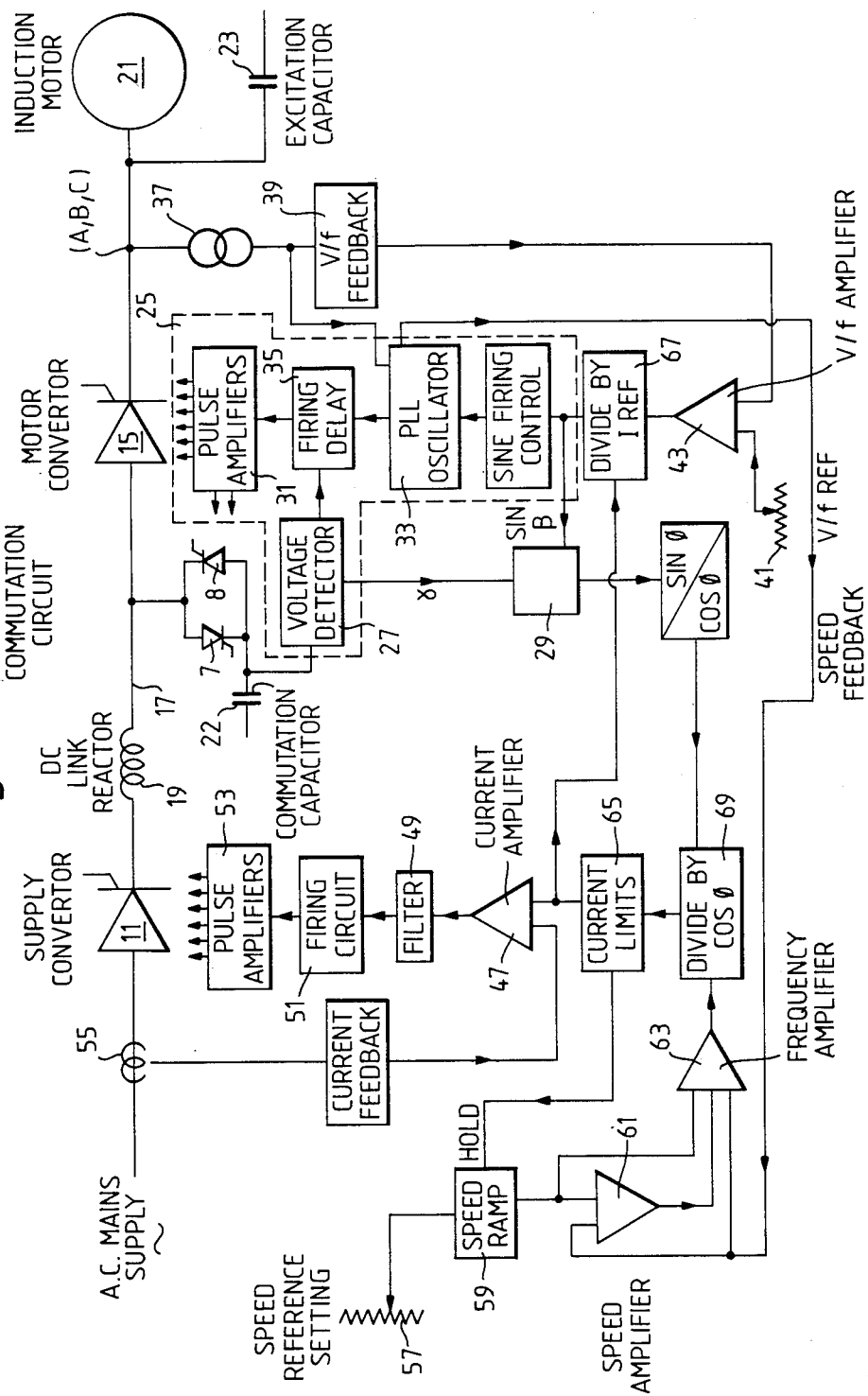
FIG. 4 is an overall block diagram of the drive circuit including various control features.

Referring now to FIG. 4, this shows a schematic diagram of the overall drive system including those essential components shown in FIG. 1.

The induction motor 21 has terminals A,B and C to which are connected the excitation capacitor bank 23. Supply convertor 11, D.C. link reactor 19, D.C. link 17 and motor convertor 15 connect the motor 21 to the A.C. supply.

The firing circuit 25 of FIG. 1 is shown to incorporate a number of components, some conventional and some specific to this application. Thus, timing for the bridge thyristors T1–T6 of FIG. 1 is obtained, as explained above, by detection of a predetermined voltage magnitude across the commutation capacitors 22. A voltage detection circuit 27 detects this level and determines the phase of the bridge-thyristor firing pulses accordingly. The duration of the transition between the capacitor 22 detection levels is also determined by the circuit 27 to provide a value for $\gamma$, the bypass thyristor conduction angle. This value is applied to a process box 29.

The frequency of the firing pulses applied by a pulse amplifier circuit 31 is determined by a phase lock loop oscillator 33 in known manner in dependence upon the integration of a signal which departs from a pre-set value in the presence of an error. The oscillator output pulses, which are basically at six times the motor frequency, i.e. at 60° electrical, control the firing of the bypass thyristors T7 and T8. With a delay angle of $\gamma$ provided by the voltage detector 27 to a delay circuit 35, the oscillator output pulses also trigger the bridge thyristors T1–T6, the two sets of pulses being distributed appropriately by the pulse amplifier circuit 31.

The phase lock loop oscillator 33 responds to the motor terminal voltage by way of a transformer 37 and also to a V/f signal from a process box 39. The latter signal is the ratio of the motor terminal voltage to the frequency and is proportional to the motor flux. This signal is compared with a reference value imposed by a control 41 in an amplifier 43. Any change in the motor flux produces an error which gradually increases or decreases (as necessary) the motor convertor firing angle $\beta$ and thus the amount of magnetising current and flux in the motor. The ratio signal and consequently the motor flux are thus corrected and maintained stable.

The supply convertor 11 is controlled by a current feedback loop with a speed control superimposed. The supply bridge thyristors are fired by way of a current amplifier 47, filter 49, firing circuit 51 and pulse amplifiers 53 in known manner. One input to the amplifier 47 is a feedback input from a transformer 55 detecting supply current magnitude.

A second input to the amplifier 47 is derived from a speed reference control 57 which is set at the desired speed. A ramp circuit 59 converts step changes to gradual changes and the resulting signal is applied to a speed amplifier 61 for comparison with a speed signal fed back from the oscillator 33, the voltage/frequency signal also constituting a speed signal. The difference signal output from amplifier 61 is applied to a frequency amplifier 63 which also receives the reference speed and feedback speed signals. The resulting output is applied to the current amplifier 47 so providing control of the D.C. link current and hence the current flowing in the motor convertor and motor.

The basic principles are that the control provided for the supply convertor controls the D.C. line current and the torque in the motor in response to the speed requirement and that the control over the motor convertor alters the angle $\beta$ of the convertor current so as to maintain the motor excitation and flux. To achieve this effectively additional signals are included between these two systems. The current demand signal from a current limit circuit 65 is used to assist in stabilising the flux control under all conditions and the signal from Box 29 to Box 69 provided is used to modify the effectiveness of the current control in dependence on the angle $\beta$.

I claim:

1. An induction motor drive arrangement comprising a controllable D.C. source, reactance means providing D.C. current inertia, a motor convertor circuit comprising a thyristor bridge whose input is connected to said D.C. source and whose A.C. output is connected to motor supply terminals for connection to an induction motor, capacitive excitation means connected to said motor supply terminals for maintaining induction motor excitation, and a commutation circuit comprising commutating capacitance connected between each of said motor supply terminals and a commutation neutral point, and a bypass path comprising two thyristor arms in series between input terminals of said thyristor bridge, the junction of said two thyristor arms being connected to said neutral point, the thyristors of said bypass arms being fired to bypass current from said motor convertor thyristors to said commutating capacitance, the thyristor of said motor convertor bridge being fired cyclically in dependence upon the voltage across said commutating capacitance, and said D.C. source current being controlled in dependence upon required motor speed and torque.

2. An induction motor drive arrangement according to claim 1, wherein said controllable D.C. source is a thyristor bridge convertor having a phase-control firing circuit for controlling the current supply to the motor convertor.

3. An induction motor drive arrangement comprising a controllable D.C. source, reactance means providing D.C. current inertia, a motor converter circuit comprising a thyristor bridge whose input is connected to said D.C. source and whose A.C. output is connected to motor supply terminals for connection to an induction motor, capacitive excitation means connected to said motor supply terminals for maintaining induction motor excitation, and a commutation circuit comprising commutating capacitance connected between each of said motor supply terminals and a commutation neutral point, and a bypass path comprising two thyristor arms in series between input terminals of said thyristor bridge, the junction of said two thyristor arms being connected to said neutral point, the thyristors of said bypass arms being fired to bypass current from said motor convertor thyristors to said commutating capacitance, the thyristors of said motor convertor bridge being fired cyclically in dependence upon the voltage across said commutating capacitance, said D.C. source current being controlled in dependence upon required motor speed and torque, and said capacitive excitation means comprising a bank of capacitors connected symmetrically to said motor supply terminals.

4. An induction motor drive arrangement comprising a controllable D.C. source, reactance means providing D.C. current inertia, a motor convertor circuit comprising a thyristor bridge whose input is connected to said D.C. source and whose A.C. output is connected to motor supply terminals for connection to an induction motor, capacitive excitation means connected to said motor supply terminals for maintaining induction motor excitation, and a commutation circuit comprising commutating capacitance connected between each of said motor supply terminals and a commutation neutral point, and a bypass path comprising two thyristor arms in series between input terminals of said thyristor bridge, the junction of said two thyristor arms being connected to said neutral point, the thyristors of said bypass arms being fired to bypass current from said motor convertor thyristors to said commutating capacitance, the thyristors of said motor convertor bridge being fired cyclically in dependence upon the voltage across said commutating capacitance, said D.C. source current being controlled in dependence upon required motor speed and torque, and said commutating capacitance comprising a star-connected capacitor bank.

5. An induction motor drive arrangement comprising a controllable D.C. source, reactance means providing D.C. current inertia, a motor convertor circuit comprising a thyristor bridge whose input is connected to said D.C. source and whose A.C. output is connected to motor supply terminals for connection to an induction motor, capacitive excitation means connected to said motor supply terminals for maintaining induction motor excitation, and a commutation circuit comprising commutating capacitance connected between each of said motor supply terminals and a commutation neutral point, and a bypass path comprising two thyristor arms in series between input terminals of said thyristor bridge, the junction of said two thyristor arms being connected to said neutral point, the thyristors of said bypass arms being fired to bypass current from said motor convertor thyristors to said commutating capacitance, the thyristors of said motor convertor bridge being fired cyclically in dependence upon the voltage across said commutating capacitance, said D.C. source current being controlled in dependence upon required motor speed and torque, and a firing circuit for said motor convertor bridge thyristors connected between said commutation and excitation neutral points.

6. An induction motor drive arrangement comprising a controllable D.C. source, reactance means providing D.C. current inertia, a motor convertor circuit comprising a thyristor bridge whose input is connected to said D.C. source and whose A.C. output is connected to motor supply terminals for connection to an induction motor, capacitive excitation means connected to said motor supply terminals for maintaining induction motor excitation, and a commutation circuit comprising commutating capacitance connected between each of said motor supply terminals and a commutation neutral point, and a bypass path comprising two thyristor arms in series between input terminals of said thyristor bridge, the junction of said two thyristor arms being connected to said neutral point, the thyristors of said bypass arms being fired to bypass current from said motor convertor thyristors to said commutating capacitance, the thyristors of said motor convertor bridge being fired cyclically in dependence upon the voltage across said commutating capacitance, said D.C. source current being controlled in dependence upon required motor speed and torque, and means for inhibiting the firing of thyristors in said bypass path above a predetermined operating frequency thereby permitting load commutation of said motor convertor above said predetermined frequency.

7. An induction motor drive arrangement comprising a controllable D.C. source, reactance means providing D.C. current inertia, a motor convertor circuit comprising a thyristor bridge whose input is connected to said D.C. source and whose A.C. output is connected to motor supply terminals for connection to an induction motor, capacitive excitation means connected to said motor supply terminals for maintaining induction motor excitation, and a commutation circuit comprising commutating capacitance connected between each of said motor supply terminals and a commutation neutral point, and a bypass path comprising two thyristor arms in series between input terminals of said thyristor bridge, the junction of said two thyristor arms being connected to said neutral point, the thyristors of said bypass arms being fired to bypass current from said motor convertor thyristors to said commutating capacitance, the thyristors of said motor convertor bridge being fired cyclically in dependence upon the voltage across said commutating capacitance, said D.C. source current being controlled in dependence upon required motor speed and torque, and inductors coupled to said capacitive excitation means to form a harmonic filler.

* * * * *

UNITED STATES PATENT AND TRADEMARK OFFICE
CERTIFICATE OF CORRECTION

PATENT NO. : 4,791,340
DATED : Dec. 13, 1988
INVENTOR(S) : David Finney

It is certified that error appears in the above-identified patent and that said Letters Patent is hereby corrected as shown below:

Title page:

"[30]   Foreign Application Priority Data

July 21, 1985"

should read:

--[30]   Foreign Application Priority Data

July 31, 1985 --.

Signed and Sealed this

Eighth Day of August, 1989

Attest:

DONALD J. QUIGG

*Attesting Officer*      *Commissioner of Patents and Trademarks*